METHOD FOR MAKING A MEMORY DEVICE

Filed June 25, 1964

INVENTORS
GILBERT R. REID
FRANK W. AMMANN

BY Rene A. Kuypers

ATTORNEY

United States Patent Office 3,414,972
Patented Dec. 10, 1968

3,414,972
METHOD FOR MAKING A MEMORY DEVICE
Gilbert R. Reid, Norristown, and Frank W. Ammann, Philadelphia, Pa., assignors to Sperry Rand Corporation, New York, N.Y., a corporation of Delaware
Filed June 25, 1964, Ser. No. 377,905
3 Claims. (Cl. 29—604)

ABSTRACT OF THE DISCLOSURE

A technique is disclosed for forming a grooved ground plane for use with plated wire memory devices. The technique forms a plurality of accurately spaced grooves which are the size of a human hair in a plastic form by use of a master template. The grooves thereby formed are covered with a thin conductive layer by electroforming techniques. After an epoxy resin backing is applied to the thin conductive layer, the plastic form is peeled off leaving a half memory plane section. Two half sections are bonded together to form a complete memory plane. The plated wires are positioned within the grooves of the ground plane.

This invention relates in general to a memory device and in particular, this invention relates to a plated wire, ground plane memory.

As plated wire, ground plane memory devices (i.e., a memory in which data storage elements are placed on an electrically conductive support member) for use with digital computers become more popular, it is evident that there is a requirement for a memory of this type which is light in weight, which is uniformly reproducible by manufacturing techniques and which has accurate groove sizes and groove spacing. Presently, known memory ground planes are somewhat expensive to fabricate and are not readily reproduced in accordance with low cost, mass production processes.

It is therefore an object of this invention to provide a new and improved ground plane memory.

It is a further object of the instant invention to provide a ground plane memory which is relatively simple to manufacture.

It is still a further object of the instant invention to provide a ground plane memory which is relatively economical to fabricate.

It is yet a further object of this invention to provide a ground plane memory which is relatively light in weight.

It is another object of the instant invention to provide a ground plane memory wherein small diameter grooves can be accurately formed.

In accordance with a feature of this invention there is provided a ground plane memory consisting of a non-conductive, grooved substrate whose two largest surfaces are covered with a thin, metallic coating. The two metallic surfaces or ground planes are electrically connected to one another by means of a metal strap. The grooves of the metal ground plane are adapted to receive small diameter wires, which are plated with a magnetizable material having the property of uniaxial anisotropy. Hereinafter these wires will be referred to simply as plated wires.

In accordance with another feature of this invention, a relatively simple and economical method has been devised to fabricate the above-mentioned grooved ground plane memory device. The method consists of electroforming (i.e., forming a thin metal layer) on the surface of a first, non-conducting plastic sheet (e.g. Plexiglas). Before electroforming, the first plastic sheet is grooved by making an impression with a metal master. The electroformed metallic surface (actually one-half of a ground plane) is then covered with a second plastic material (e.g. epoxy resin ) which is allowed to harden by curing. Another half of a ground plane is then made in the same manner as above described. Both ground plane halves are then bonded to one another via the sides having the cured epoxy resin with more epoxy resin. After both halves of the ground plane have been bonded to one another the plastic sheets are then stripped from the metallic surfaces. The upper and lower metallic surfaces are then electrically connected to one another by means of U-shaped straps around the edges of the plane.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawings, wherein:

Figure 1:
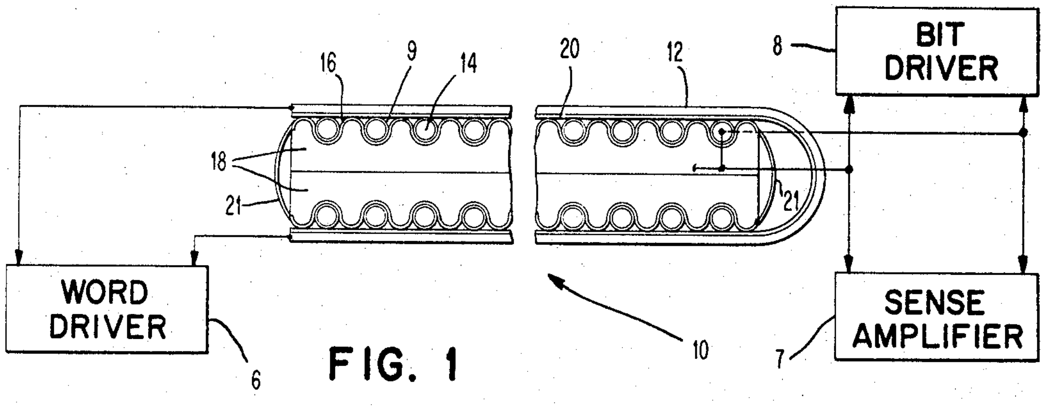
FIGURE 1 depicts a ground plane memory device having plated wires positioned in the grooves thereof.

Referring now to FIGURE 1, there is provided a grooved ground plane memory device 10 which is adapted to receive the plated wires 14. The plated wires 14 are made of beryllium copper and are approximately five mils in diameter. The wire substrates are electroplated with approximately a 10,000 Angstrom Permalloy (80% nickel-20% iron) coating. The Permalloy coating is electroplated in the presence of a circumferential magnetic field that establishes a uniaxial anisotropy axis at right angles (i.e., around the circumference) to the length of the wire. The uniaxial anisotropy establishes an "easy" and "hard" direction of magnetization and the magnetization vectors of the thin film are normally oriented in one of two equilibrium positions along the "easy" axis, thereby establishing two bistable states necessary for binary logic operation. The plated wires 14 are normally coated with an insulating material 9 such as varnish before being positioned in the grooves of the ground plane in order to protect the magnetic coating from being damaged.

The grooves of the ground plane 10 as well as the crests forming the grooves have a thin, metallic layer of silver or copper 16 coated thereon and electrical continuity is provided between the upper and lower metal surfaces by means of electrically conductive straps 21, which are attached to each surface. The metallic surfaces 16 are formed on the non-conducting surface 18, which is a plastic material such as epoxy resin.

Positioned orthogonally and in juxtaposition to the plated wires is the metallic drive line 12. A plurality of such drive lines may be arranged next to one another, the number depending upon the size of the memory required. Interposed between the drive line 12 and the metallic surface 16 is an insulating material 20 such as glass epoxy or Mylar. The drive line 12 is shown as a single-turn solenoid and is typically 20 mils wide. It should be understood that the ground drive line 12 need not necessarily be of a solenoid configuration and hence, may consist, for example, of individual flat straps. The drive line 12 is connected by appropriate leads to a word driver 6.

A bit position or location of stored information is defined by the intersection of a plated wire 14 with a drive line 12. A bit position is capable of storing a binary "zero" or binary "one" according to whether the magnetization vectors under the drive line 12 are oriented in one of two possible directions along the "easy" axis of magnetization. The particular orientation of the magnetization vectors at a particular bit position along the plated wire 14 is determined by sense amplifiers such as sense amplifier 7, which are connected to each plated wire. Bit drivers such as bit driver 8 are also connected to each plated wire 14 in order to supply steering current whenever it is required to record new binary information in a certain bit position. In all other respects, the plated wire memory device of FIGURE 1 operates in the manner described in the copending application of George A. Fedde, Ser. No. 288,-653, filed June 18, 1963, now U.S. 3,371,326.

The operation of a single bit during a read or write cycle may be briefly summarized from the description provided in the above cited patent application. Thus, for a read cycle, the drive line 12 is energized by the word driver 6, thereby rotating the magnetization vectors from the "easy" axis toward the "hard" axis of magnetization at an angles less than 90 degrees. This causes a voltage to be induced in the plated wire whose polarity is dependent upon whether a binary "zero" or binary "one" is stored at the required bit position and the polarity of the induced signal is determined by the sense amplifier 7. For a write cycle, the drive line 12 is again energized by the word driver 6 in conjunction with current supplied by the bit driver 8. In operation, the drive line 12 again rotates the magnetization vectors into the "hard" axis of magnetization at some angles less than 90 degrees and the current in the plated wire 14 from the bit driver 8 steers the magnetization vectors through the 90 degree position so that when the current is removed in both the plated wire 14 and the drive line 12, the magnetization vectors return to rest in the desired orientation along the "easy" axis. The magnetic vector orientation, as above mentioned, determines whether a binary "one" or binary "zero" is stored in the bit position.

The energizing of the drive line 12 causes an image current to be developed in the conducting ground plane 16 by magnetic induction. The current in the energized drive line 12 produces a flux which coacts with the additional flux produced by the induced image currents (which flow in an opposite direction from that of the drive line). This total flux couples to the required bit positions under the drive line 12 and rotates each of the magnetization vectors of the thin films from the "easy" toward the "hard" axis of magnetization through an angle less than 90 degrees.

Figure 2:
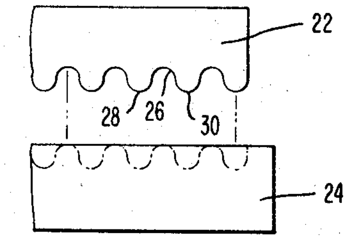
FIGURE 2 depicts the method step of pressing parallel grooves in a plastic sheet by means of a metal master.

The fabrication of the ground plane memory device 10 of FIGURE 1 will now be discussed in relationship to FIGURES 2, 3, 4 and 5. Referring now to FIGURE 2, a polished brass master 22 is accurately machined with parallel grooves 26, which will be of sufficient diameter to receive the five mil diameter plated wires 14. In actual practice, the grooves 26 are approximately 8 mils wide by 8 mils deep and are normally arranged 25 to the inch. However, higher packing densities may be readily obtained if required. The master 22 is then heated by appropriate means and pressed into a plastic acrylic or vinyl sheet 24 to form a reverse pattern thereof. In other words, the projections 28 and 30 in the master 22 provides the grooves in the plastic sheet 24.

Figure 3:
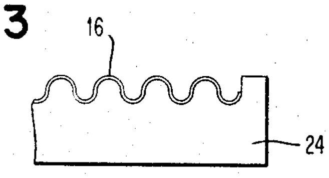
FIGURE 3 shows the method step of forming a thin metallic layer on the plastic pressing.

The plastic pressing 24 is then made electrically conductive by silvering and then copper plating to a thickness of approximately 10 mils. FIGURE 3 shows the result of the plating operation wherein an electroformed replica or metal layer 16 of the original metal pattern (FIGURE 2) is formed on the pressed plastic sheet 24.

Figures 4, 5:
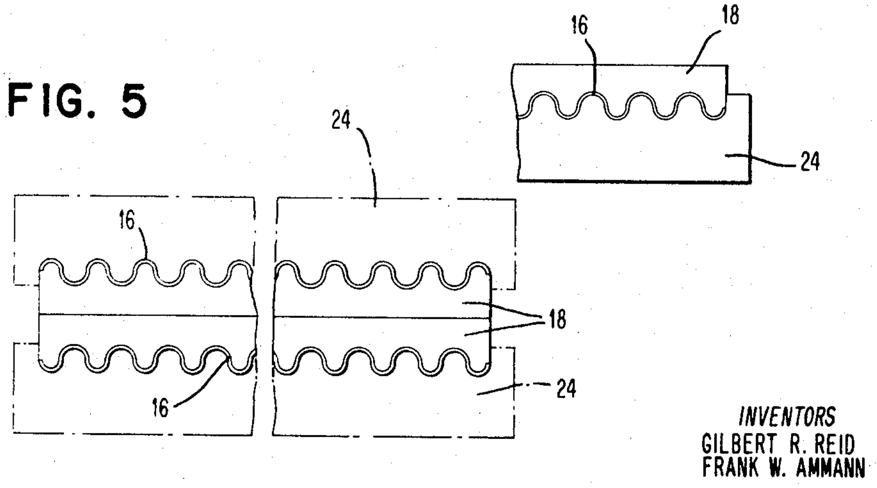
FIGURE 4 depicts the grooved metallic surface coated with a plastic filler.
FIGURE 5 depicts the joining of two ground plane halves into an integral unit.

FIGURE 4 shows one-half of the copper ground plane 16 being filled with or coated with an epoxy resin 18 having the same expansion characteristics as the metal plane 16. After the epoxy resin has been applied, it is allowed to cure and harden.

In order to provide the ground plane memory device 10 of FIGURE 1, two sections must be fabricated in accordance with the method just described in FIGURES 2, 3 and 4. FIGURE 5 therefore depicts the bonding of both halves or ground plane sections to one another. Therefore, the two halves are bonded to one another with the same plastic material, namely, epoxy resin 18 as was used to coat the electroformed surface 16 in FIGURE 4. If required, the two halves can be reinforced with aluminum honeycomb and then bound together with an adhesive. After the epoxy resin 18 has been cured and a permanent set has taken place, the plastic forms 24 are carefully stripped from the thin metal layers 16. After the plastic forms have been stripped from the metal layers, the upper and lower metal surfaces of the ground plane are made electrically conductive by soldering a U-shaped strap 21 around the periphery of the plane. The electrically conductive ground plane is then ready to receive the data storage elements comprising the plated magnetic wires 14. From the above description of the method of fabrication, it is apparent that the ground plane memory device can be simply and economically obtained because of simple manufacturing techniques involved. Furthermore, because of the materials employed, the memory device is of light weight construction.

Obviously, many modifications and variations of the present invention are possible in the light of the above teaching. It is therefore to be understood that in the scope of the appended claims, the invention may be practiced otherwise than as specifically described.

The embodiments of the invention in which an exclusive property or privilege is claimed are defined as follows.

We claim:

1. The method of fabricating a ground plane memory comprising the steps of: forming a reverse grooved pattern on first and second relatively soft non-conductive substrates, said grooves being on the order of 5 mils in diameter; coating said first reverse grooved pattern with a first conductive metal layer and further coating said second reverse grooved pattern with a second conductive metal layer; coating said first and second metal layers with a non-conductive filler material; bonding said non-conductive coatings on said first and second metal layers to one another; providing an ohmic connection between said first and second metal layers after stripping said first and second substrates from said respective first and second metal layers.

2. The method of fabricating a ground plane memory device comprising the steps of: machining an accurately grooved metal master, said grooves being on the order of 5 mils in diameter; heating said metal master and then obtaining reverse patterns thereof by pressing said metal master into first and second sheets of non-conductive plastic material; covering said first reverse pattern with a first conductive metal layer and further covering said second reverse grooved pattern with a second metal layer; coating said first and second metal layers with a plastic filler; bonding said first and second reverse patterns to one another by way of said plastic fillers; stripping said first and second sheets of plastic material from said respective first and second thin layers of metal; providing an ohmic connection between said first and second metal layers and inserting wires within said grooves and placing conductive straps around said wires and orthogonal thereto.

3. The method of fabricating a ground plane memory device comprising the steps of: machining an accurately grooved metal master; heating said metal master and then pressing said master into first and second sheets of acrylic plastic to form first and second reverse patterns of said master; electroforming said first and second acrylic plastic sheets to provide respective first and second conductive metallic layers thereon; coating said first and second metallic layers formed on said respective first and second plastic sheets with epoxy resin and curing said resin; bonding said first and second reverse patterns to one another on the side having said curved resin coating with epoxy resin;

stripping said first and second plastic forms from said respective first and second metallic layers; joining said first and second metal layers to one another to provide an ohmic connection and a conductive ground plane.

References Cited

UNITED STATES PATENTS

| | | | |
|---|---|---|---|
| 2,724,674 | 11/1955 | Pritikin | 317—101 X |
| 3,025,201 | 3/1962 | Ponemon | 264—277 X |
| 3,077,021 | 2/1963 | Brownlow | 29—604 X |
| 3,077,658 | 2/1963 | Wharton | 29—625 X |
| 3,240,624 | 3/1966 | Beck. | |
| 3,340,606 | 9/1967 | Andreson et al. | 29—625 |

JOHN F. CAMPBELL, *Primary Examiner.*

D. C. REILEY, *Assistant Examiner.*

U.S. Cl. X.R.

29—625; 317—101